US007866409B2

(12) United States Patent
Vaughn et al.

(10) Patent No.: US 7,866,409 B2
(45) Date of Patent: Jan. 11, 2011

(54) TILLING MACHINE TRANSPORT AND STORAGE APPARATUSES AND METHODS

(75) Inventors: Christopher Wayne Vaughn, Mebane, NC (US); Andrew Joseph McDaniel, Chapel Hill, NC (US)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 11/850,993

(22) Filed: Sep. 6, 2007

(65) Prior Publication Data
US 2009/0065221 A1 Mar. 12, 2009

(51) Int. Cl.
*A01B 33/00* (2006.01)
(52) U.S. Cl. .......................... 172/42; 172/240
(58) Field of Classification Search ............ 172/41, 172/42, 43, 240, 241, 244, 256, 259, 395, 172/397
See application file for complete search history.

(56) References Cited

U.S. PATENT DOCUMENTS

| 913,953 | A | * | 3/1909 | Granger | 172/43 |
|---|---|---|---|---|---|
| 1,704,986 | A | * | 3/1929 | Marcy | 172/21 |
| 1,878,442 | A | * | 9/1932 | Hamshaw | 172/43 |
| 2,375,137 | A | * | 5/1945 | Rutishauser | 172/43 |
| 2,834,276 | A | * | 5/1958 | Schwab | 172/42 |
| 2,903,077 | A | * | 9/1959 | Kamlukin | 172/42 |
| 3,074,490 | A | * | 1/1963 | Burns | 172/42 |
| 3,282,353 | A | * | 11/1966 | Troyer et al. | 172/43 |
| 3,620,307 | A | | 11/1971 | Vilela | |
| 3,792,734 | A | * | 2/1974 | Ellis et al. | 172/43 |
| 3,901,325 | A | * | 8/1975 | Richards | 172/81 |
| 3,952,490 | A | | 4/1976 | Brockman | |
| 4,164,983 | A | | 8/1979 | Hoch | |
| 4,165,786 | A | * | 8/1979 | Dobberpuhl | 172/43 |
| 4,191,259 | A | | 3/1980 | Boren | |

(Continued)

FOREIGN PATENT DOCUMENTS

EP 0774200 A1 5/1997

(Continued)

OTHER PUBLICATIONS

European Search Report Dated Dec. 23, 2008 for EPO Application No. 08 015 650.8.

(Continued)

*Primary Examiner*—Thomas B Will
*Assistant Examiner*—Jamie L McGowan
(74) *Attorney, Agent, or Firm*—Jenkins, Wilson, Taylor & Hunt, P.A.

(57) ABSTRACT

Apparatuses and methods are provided to facilitate the transport and storage of tilling machines and specifically mini-tillers. A wheel apparatus can attach to a tilling machine, such as by attachment to a drag bar, in a transport position or a storage position. In the transport position, the wheel apparatus can maintain tiller tines of the tilling machine above the ground surface with the weight of the tilling machine supported on the wheel apparatus, thereby allowing the tilling machine to be rolled for transport. In the storage position, the wheel apparatus can be attached to the drag bar, whereby both the tiller tines and the wheel apparatus rest on the ground surface to provide stability to the tilling machine. During operation the wheel apparatus can be removed from the tilling machine.

22 Claims, 15 Drawing Sheets

U.S. PATENT DOCUMENTS

| | | | |
|---|---|---|---|
| 4,224,996 A * | 9/1980 | Dobberpuhl | 172/42 |
| 4,336,760 A * | 6/1982 | Cohen et al. | 111/131 |
| D280,824 S * | 10/1985 | Mikado | D15/12 |
| 4,621,697 A * | 11/1986 | Webb | 172/42 |
| RE32,467 E * | 8/1987 | Mays | 172/253 |
| 4,699,219 A * | 10/1987 | Durrant et al. | 172/42 |
| 4,811,794 A | 3/1989 | Greene | |
| 5,054,278 A | 10/1991 | Thorndike | |
| 5,156,217 A * | 10/1992 | Hirata et al. | 172/15 |
| 5,197,551 A * | 3/1993 | Farley | 172/42 |
| 6,131,670 A | 10/2000 | Johnson | |
| 6,779,611 B2 * | 8/2004 | Sugimoto et al. | 172/42 |
| 6,920,939 B2 * | 7/2005 | Sasaoka et al. | 172/119 |
| 6,968,906 B2 * | 11/2005 | Ito et al. | 172/41 |
| D523,026 S | 6/2006 | Vaughn | |
| 7,143,835 B2 * | 12/2006 | Fukuzumi et al. | 172/119 |
| 7,237,620 B2 * | 7/2007 | Abenroth et al. | 172/42 |
| 2003/0178208 A1 | 9/2003 | Abenroth et al. | |
| 2005/0045347 A1 * | 3/2005 | Stark et al. | 172/42 |
| 2007/0163789 A1 * | 7/2007 | Thackery | 172/42 |

FOREIGN PATENT DOCUMENTS

| | | |
|---|---|---|
| EP | 1201110 A1 | 5/2002 |
| EP | 1329611 A2 | 7/2003 |
| FR | 2666718 A1 | 9/1990 |

OTHER PUBLICATIONS

First Office Action from European Patent Office for EP Application No. 08 015 650.8 dated Jan. 16, 2009.

Notification of European publication number and information on the application for Article 67(3) dated Feb. 11, 2009 for EP Application No. 08 015 650.8 which will publish on Mar. 11, 2009 as No. 2 033 505.

Communication pursuant to Rule 71 (3) EPC; intent to grant dated Oct. 13, 2009 for European Patent Application No. 08 015 650.8.

Letters Patent from European Patent Office dated Mar. 10, 2010 for European Patent No. 2 0335 05 (application No. 08 015 650.8.

* cited by examiner

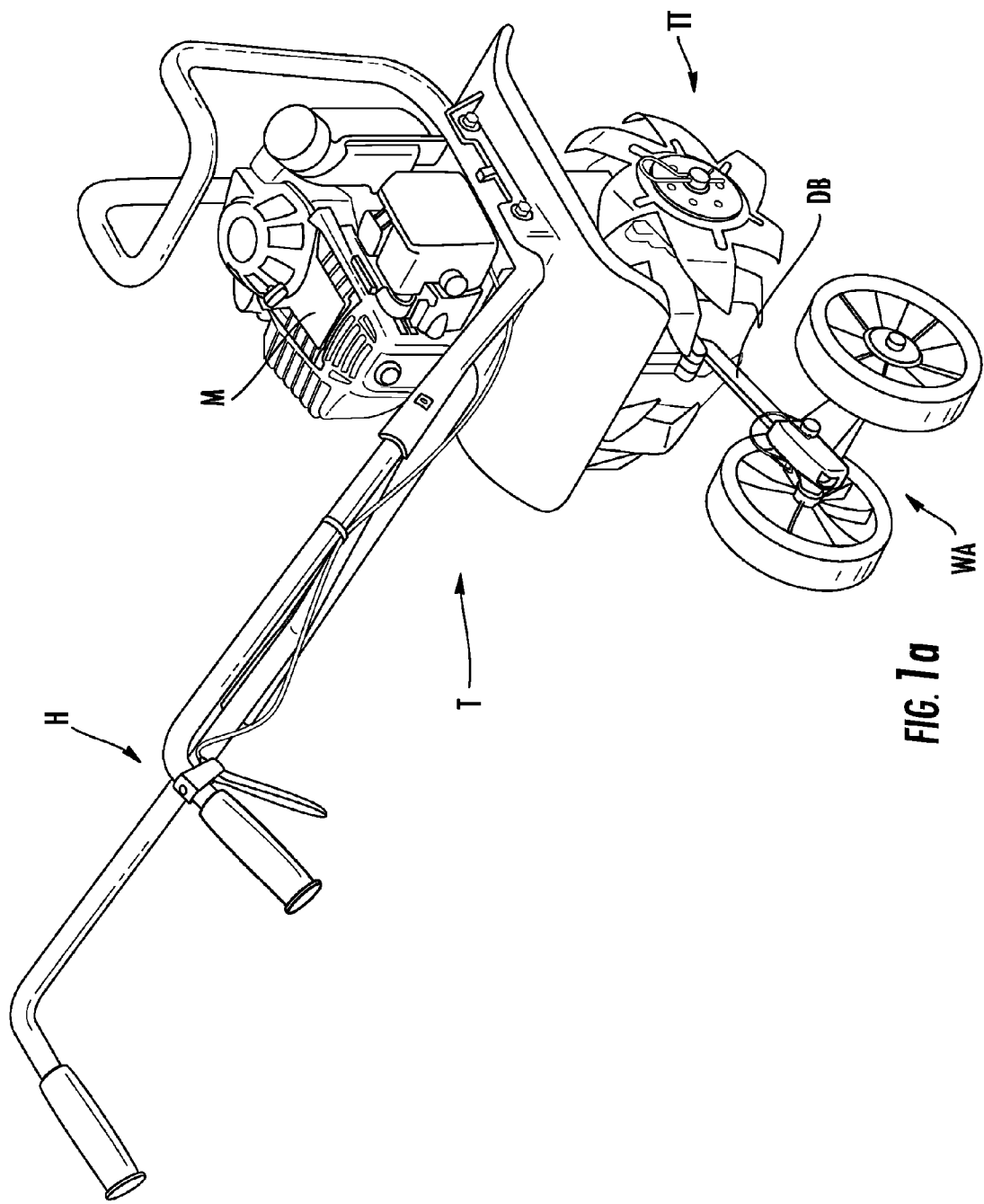

TILLING MACHINE TRANSPORT AND STORAGE APPARATUSES AND METHODS

TECHNICAL FIELD

The subject matter disclosed herein relates generally to apparatuses and methods designed to facilitate the transport and storage of tilling machines, and more particularly to providing a multi-positionable, auxiliary wheel apparatus for a tilling machine, such as a minitiller.

BACKGROUND

The popularity of gardening has brought about an array of tilling machines designed to lessen the physical labor associated with gardening. Designed for smaller gardening applications, such as cultivating, the mini-tiller has become a popular choice among gardeners. However, the compact and lightweight design of mini-tillers often precludes the incorporation of wheels on the machines. While the lack of wheels decreases the weight of the machine and improves maneuverability while tilling, the portability of the mini-tiller is compromised when the mini-tiller tines are disengaged and there are no wheels on which to transport the machine.

Therefore, a wheel apparatus would be advantageous to facilitate the transport of tilling machines, particularly mini-tillers. Further, a wheel apparatus that is readily removable would not take away from the maneuverability and compact design of the mini-tiller when in use as a tilling machine.

Wheel assemblies are currently available on tilling machines, particularly self-propelled tillers and tillers designed for larger applications. Some tilling machines have wheels that are vertically adjustable to allow for a working mode in which tiller tine depth can be selectively controlled at a plurality of depths, as well as a transport mode wherein the tiller tines are maintained above the soil and the weight of the tilling machine is supported on the wheels such that the tilling machine can be rolled during transport. Other tilling machines utilize the wheels as a means of propulsion by directing power from the engine to the ground engaging wheels. Still yet, other tilling machines utilize wheels as a stabilizing means while in working mode.

SUMMARY

In accordance with the present disclosure as described further herein, wheel apparatuses and methods are provided for the transport and storage of tilling machines such as mini-tillers.

It is therefore an object of the present disclosure to provide novel apparatuses and methods for transporting and storing a tilling machine, such as a mini-tiller, by providing a wheel apparatus that can be attached to a tilling machine in one or more positions to allow both transport and storage of the tilling machine.

An object having been stated hereinabove, and which is achieved in whole or in part by the subject matter disclosed herein, other objects will become evident as the description proceeds when taken in connection with the accompanying drawings as best described herein below.

BRIEF DESCRIPTION OF THE DRAWINGS

The full and enabling disclosure of the present subject matter including the best mode thereof to one of ordinary skill in the art is set forth more particularly in the remainder of the specification including references to the accompanying figures in which:

FIG. 1a is a perspective view of an embodiment of a wheel apparatus for transporting and storing a tilling machine, shown attached to a mini-tiller in a transport position according to the subject matter disclosed herein;

DETAILED DESCRIPTION

Reference will now be made in detail to the description of the present subject matter, one or more examples of which are shown in the figures. Each example is provided to explain the subject matter and not as a limitation. Features illustrated or described as part of one embodiment can be used in another embodiment to yield still a further embodiment. It is intended that the present subject matter covers such modifications and variations.

Figure 1B:
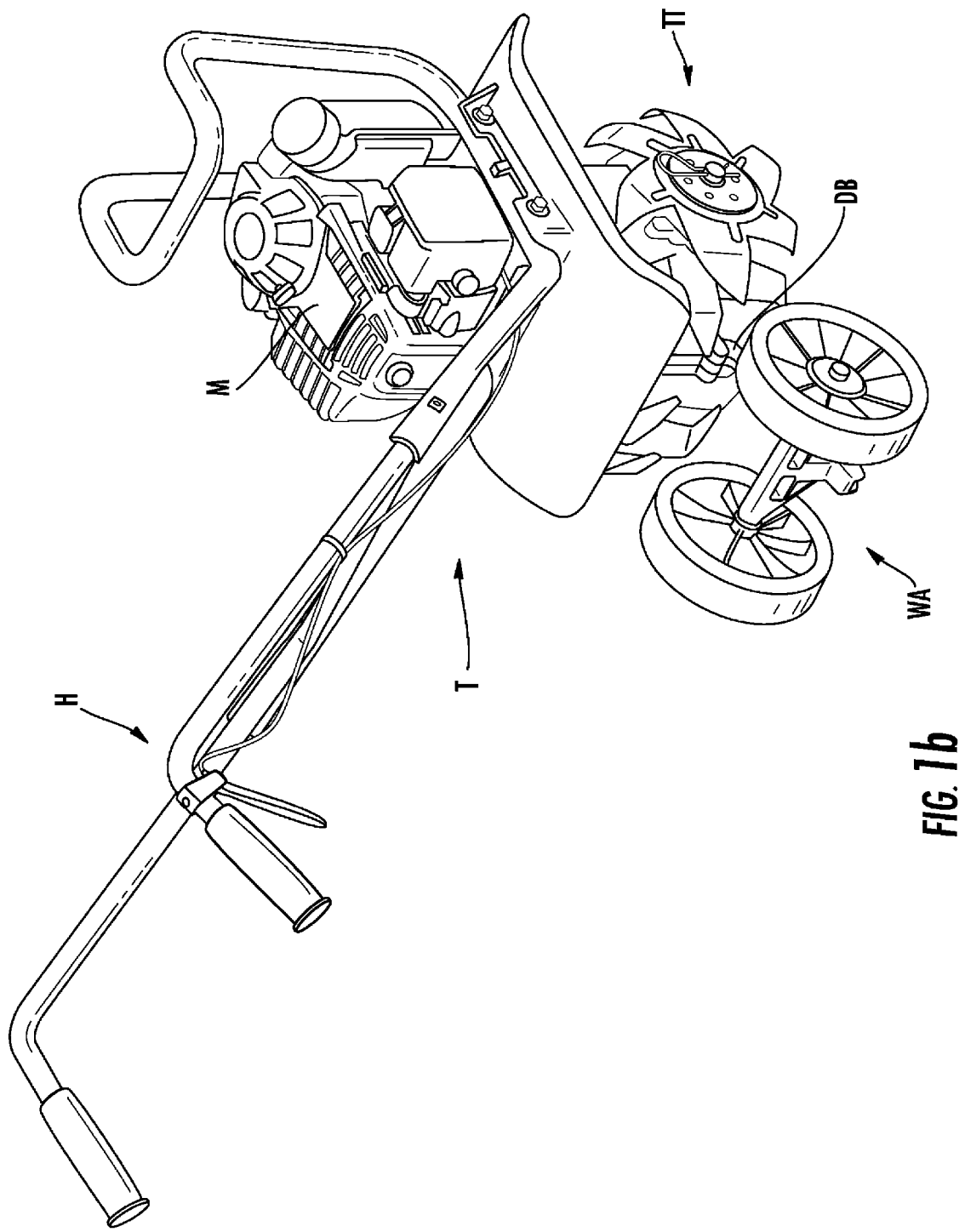
FIG. 1b is a perspective view of an embodiment of a wheel apparatus for transporting and storing a tilling machine, shown attached to a mini-tiller in a storage position according to the subject matter disclosed herein.

Referring now to FIGS. 1a and 1b, and as one example of a tilling apparatus generally designated T, tiller T is illustrated as a mini-tiller. It can be appreciated, however, that the present disclosure is not limited to mini-tillers and that the present disclosure can apply to and be used with any suitable tilling apparatus.

Continuing with the example provided in FIGS. 1a and 1b, tiller T can till soil by rotating tiller tines generally designated TT. Tiller T can be powered by a motor M that can be, for example, a gasoline powered motor. Motor M can transfer power to tiller tines TT such that tiller tines TT can be rotated to till soil. Tiller T can include a handle generally designated H that can permit a user to guide and steer tiller T. A drag bar DB can be attached to or part of tiller T and can be used for contacting the soil during tilling to provide stability and create resistance during operation, thereby retarding the forward motion of tiller T. In accordance with the subject matter disclosed herein, a wheel apparatus generally designated WA can attach to drag bar DB to facilitate transportation of tiller T when in a transport position (FIG. 1a) and to facilitate storage of tiller T when in a storage position (FIG. 1b).

Figure 2:
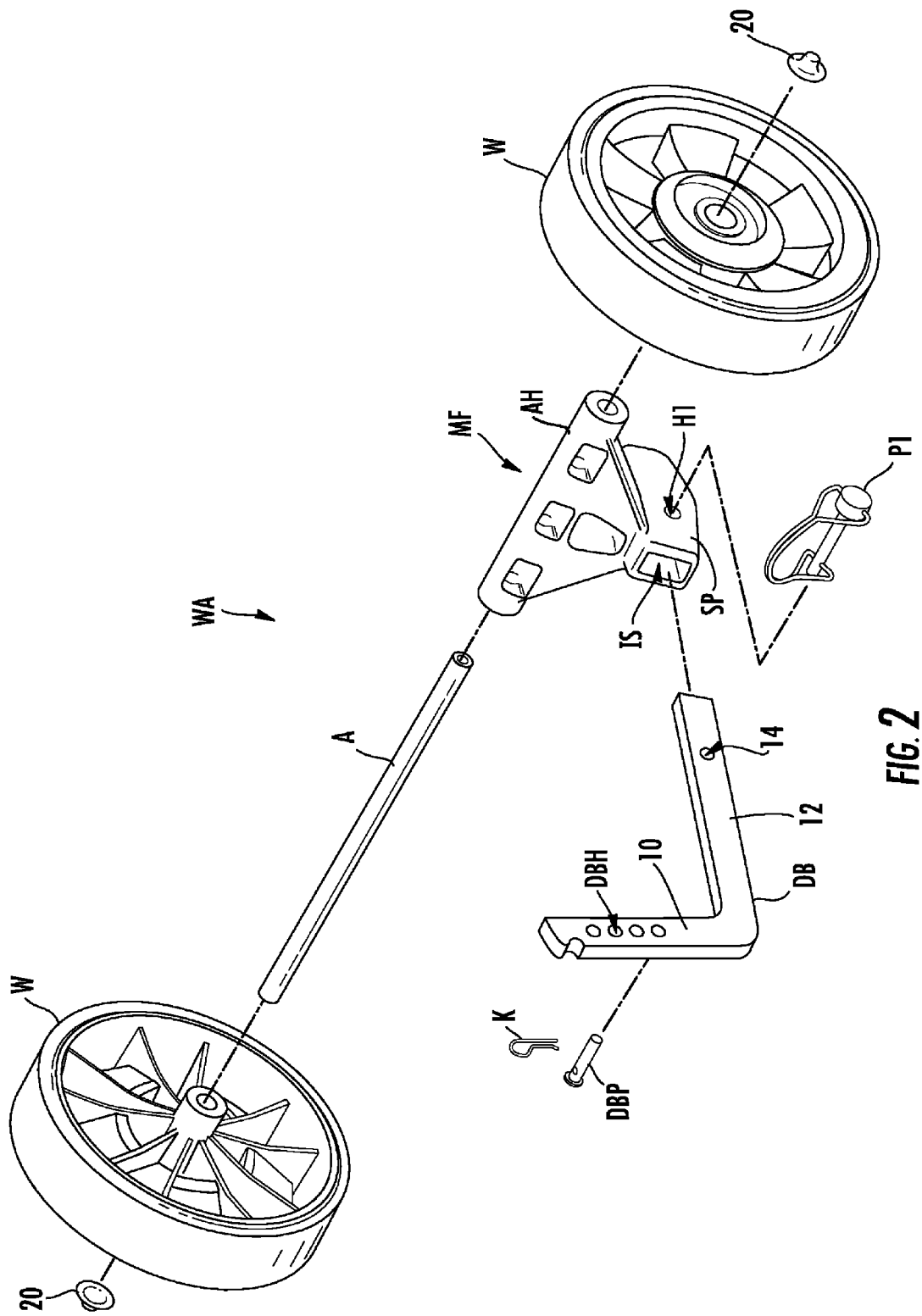
FIG. 2 is an exploded view of an embodiment of a wheel apparatus for transporting and storing a tilling machine according to the subject matter disclosed herein.
Figure 3A:
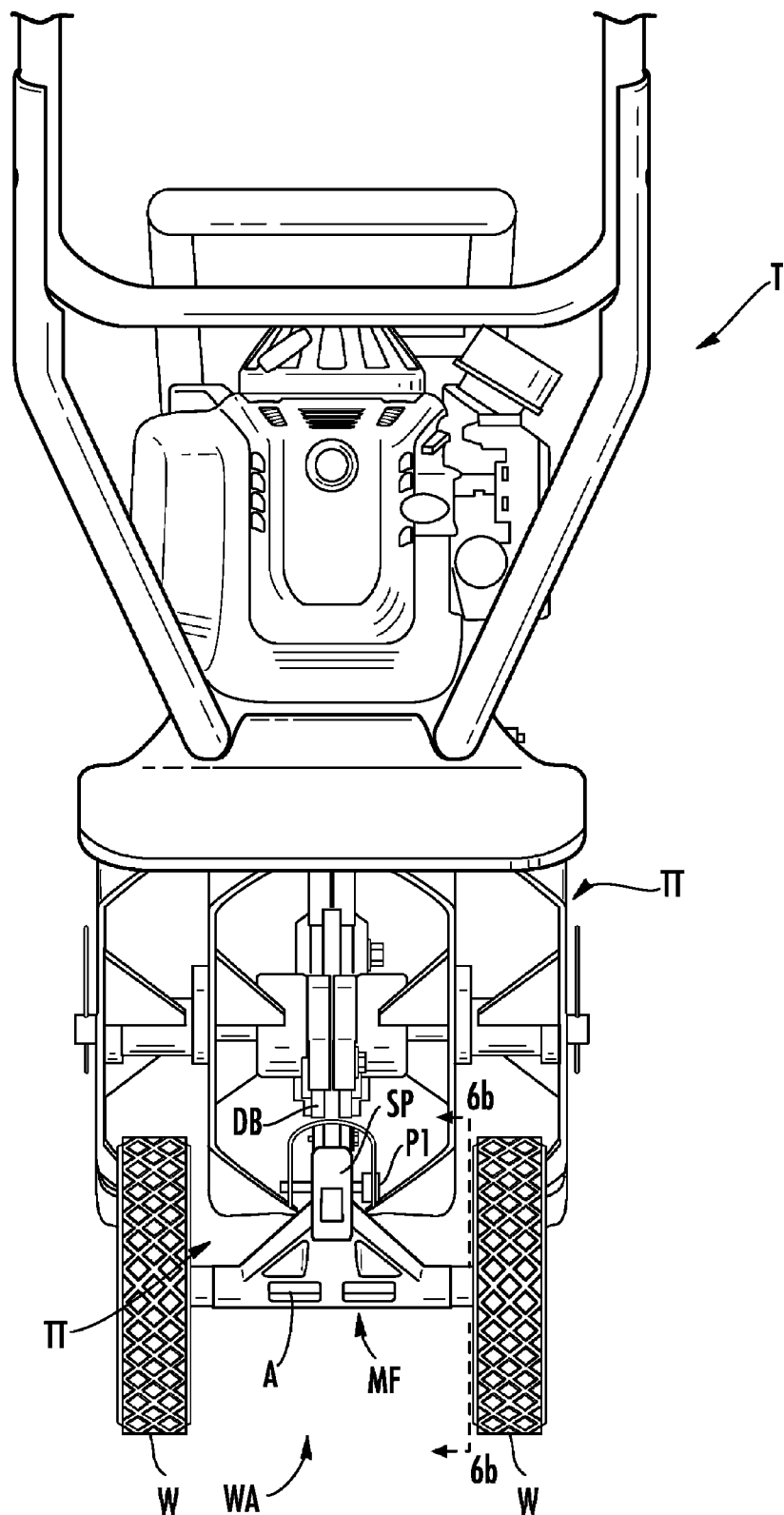
FIG. 3a is a rear view of an embodiment of a wheel apparatus for transporting and storing a tilling machine, shown attached to a mini-tiller in a transport position according to the subject matter disclosed herein.
Figure 3B:
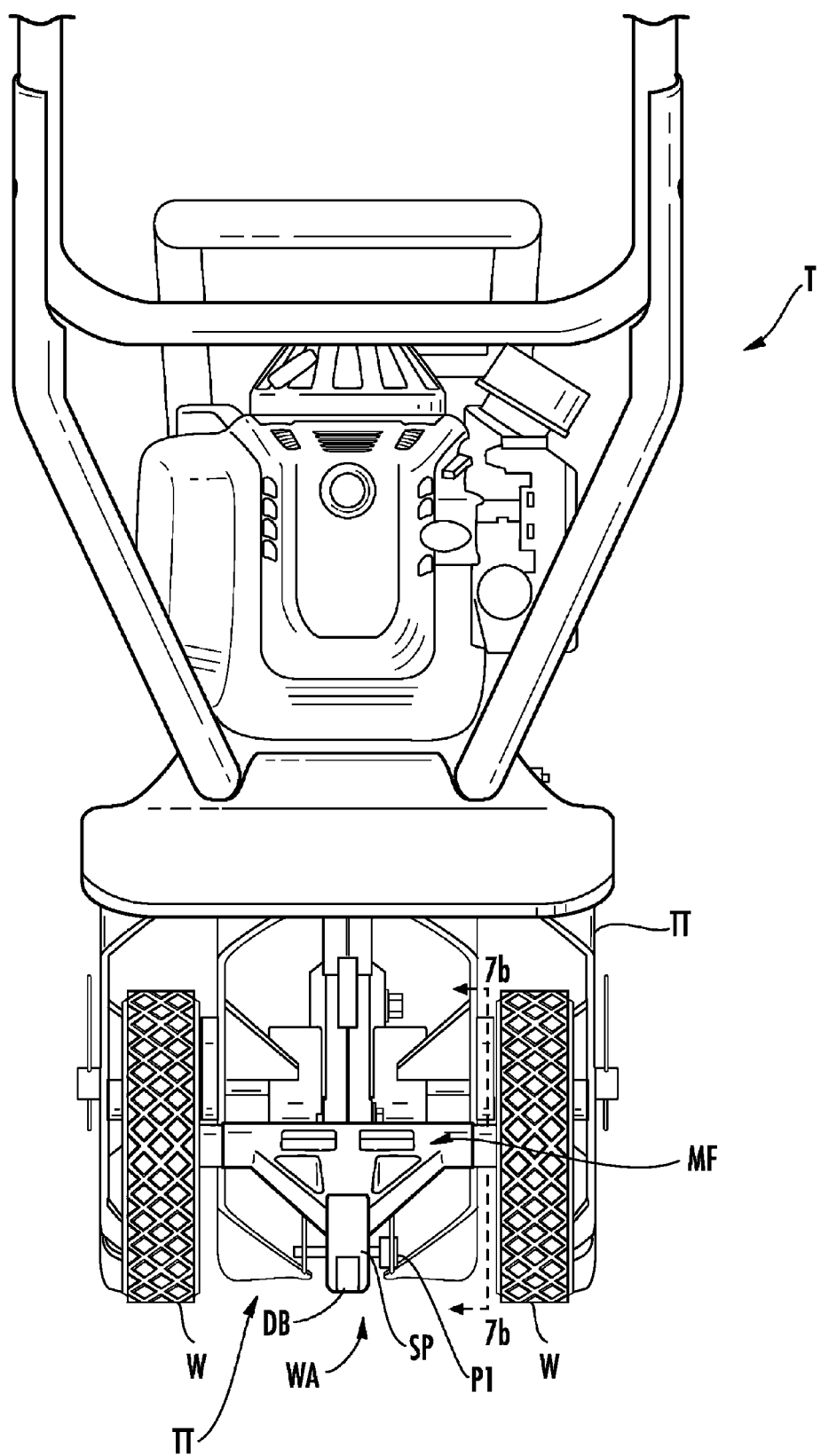
FIG. 3b is a rear view of an embodiment of a wheel apparatus for transporting and storing a tilling machine, shown attached to a mini-tiller in a storage position according to the subject matter disclosed herein.
Figure 4A:
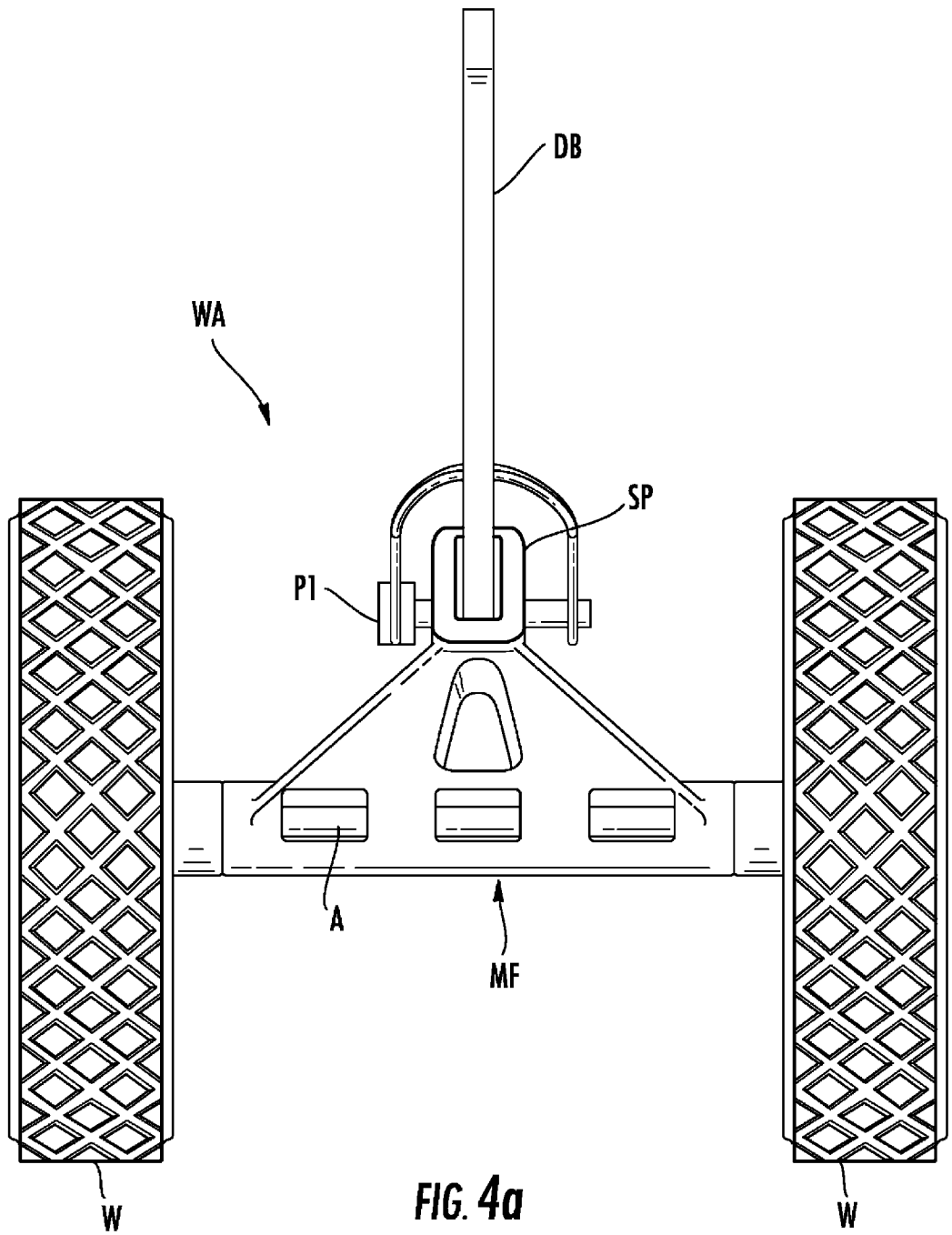
FIG. 4a is a front view of an embodiment of a wheel apparatus for transporting and storing a tilling machine, shown attached to a drag bar in a transport position according to the subject matter disclosed herein.
Figure 4B:
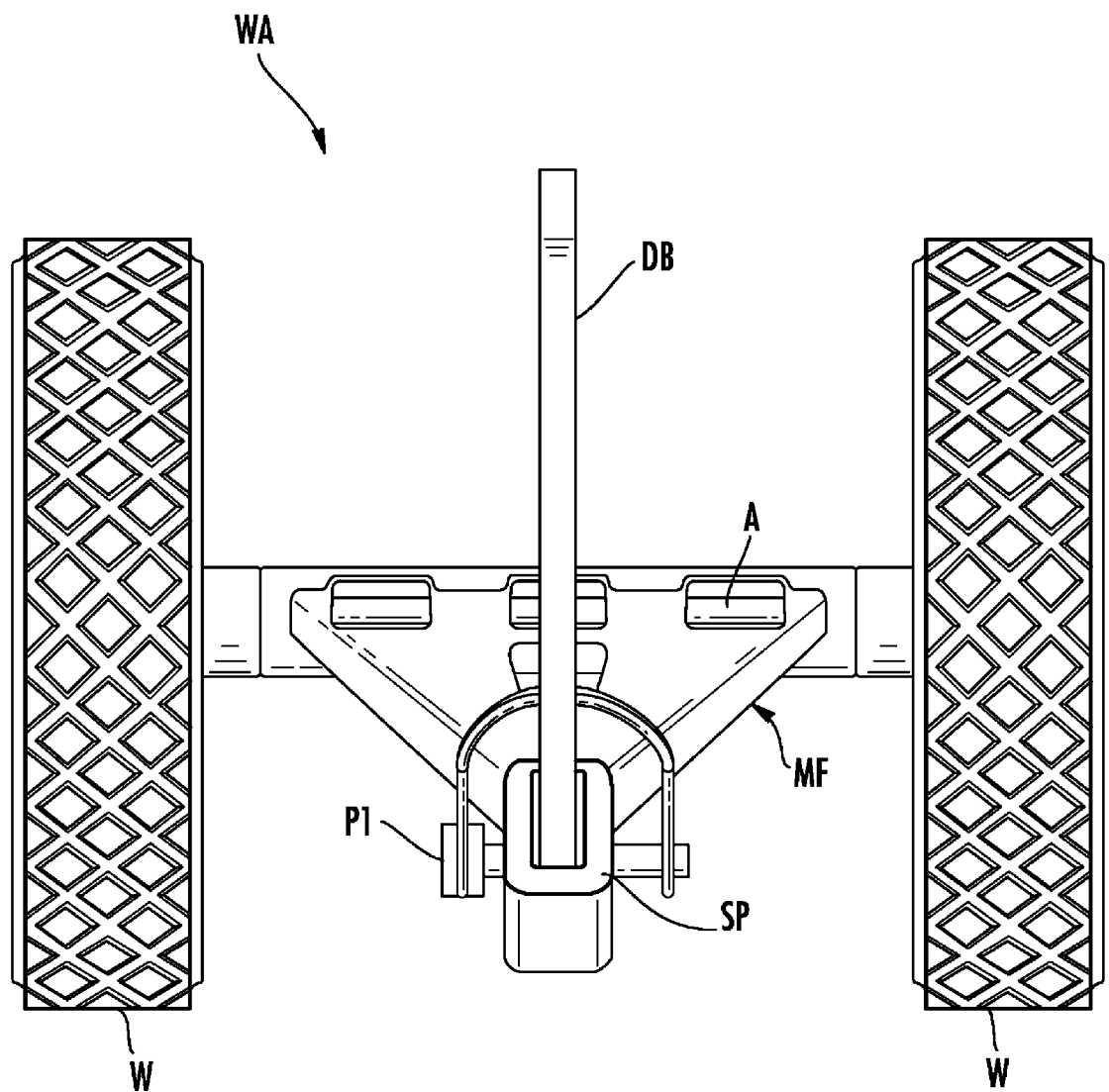
FIG. 4b is a front view of an embodiment of a wheel apparatus for transporting and storing a tilling machine, shown attached to a drag bar in a storage position, according to the subject matter disclosed herein.
Figure 5A:
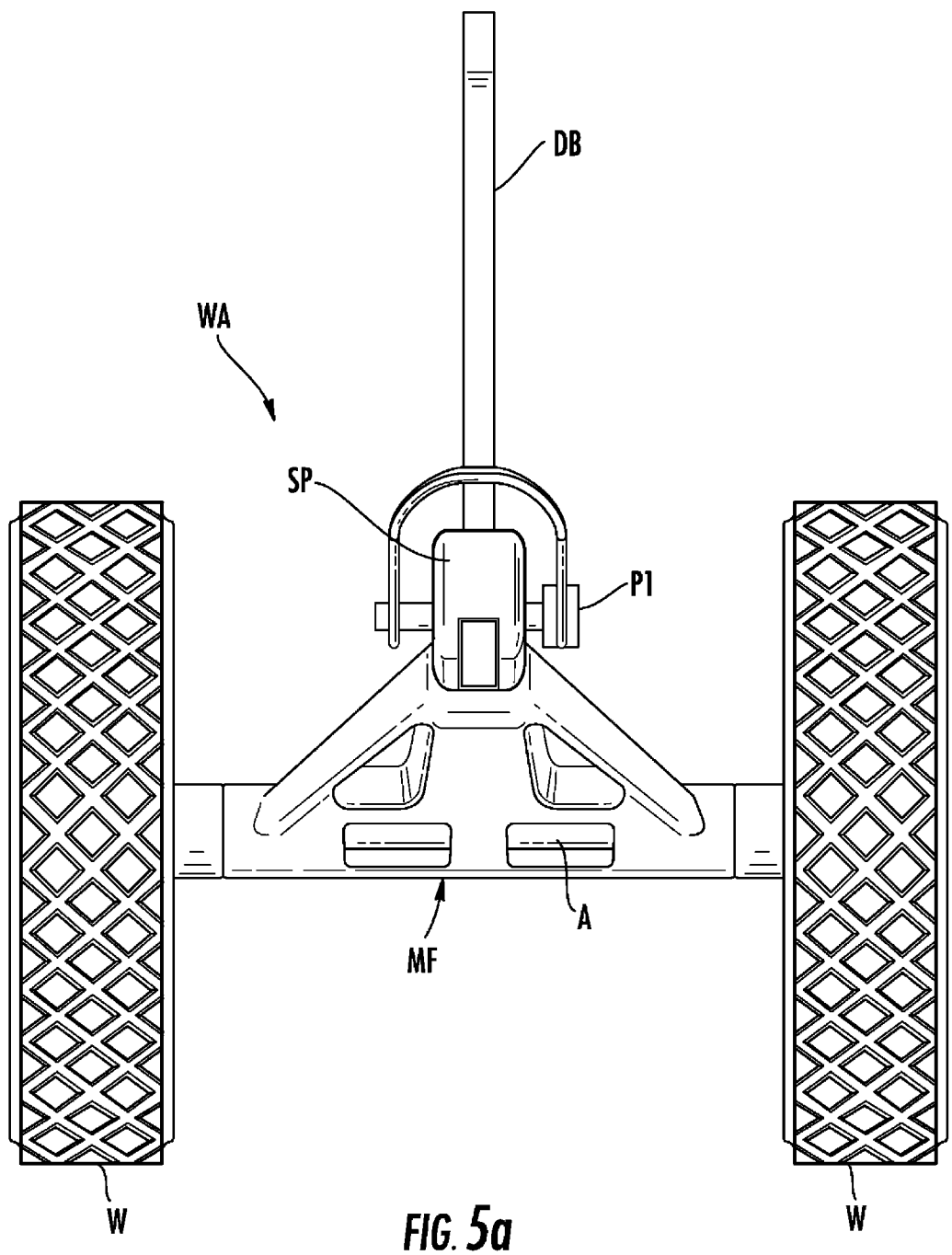
FIG. 5a is a rear view of an embodiment of a wheel apparatus for transporting and storing a tilling machine, shown attached to a drag bar in a transport position according to the subject matter disclosed herein.
Figure 5B:
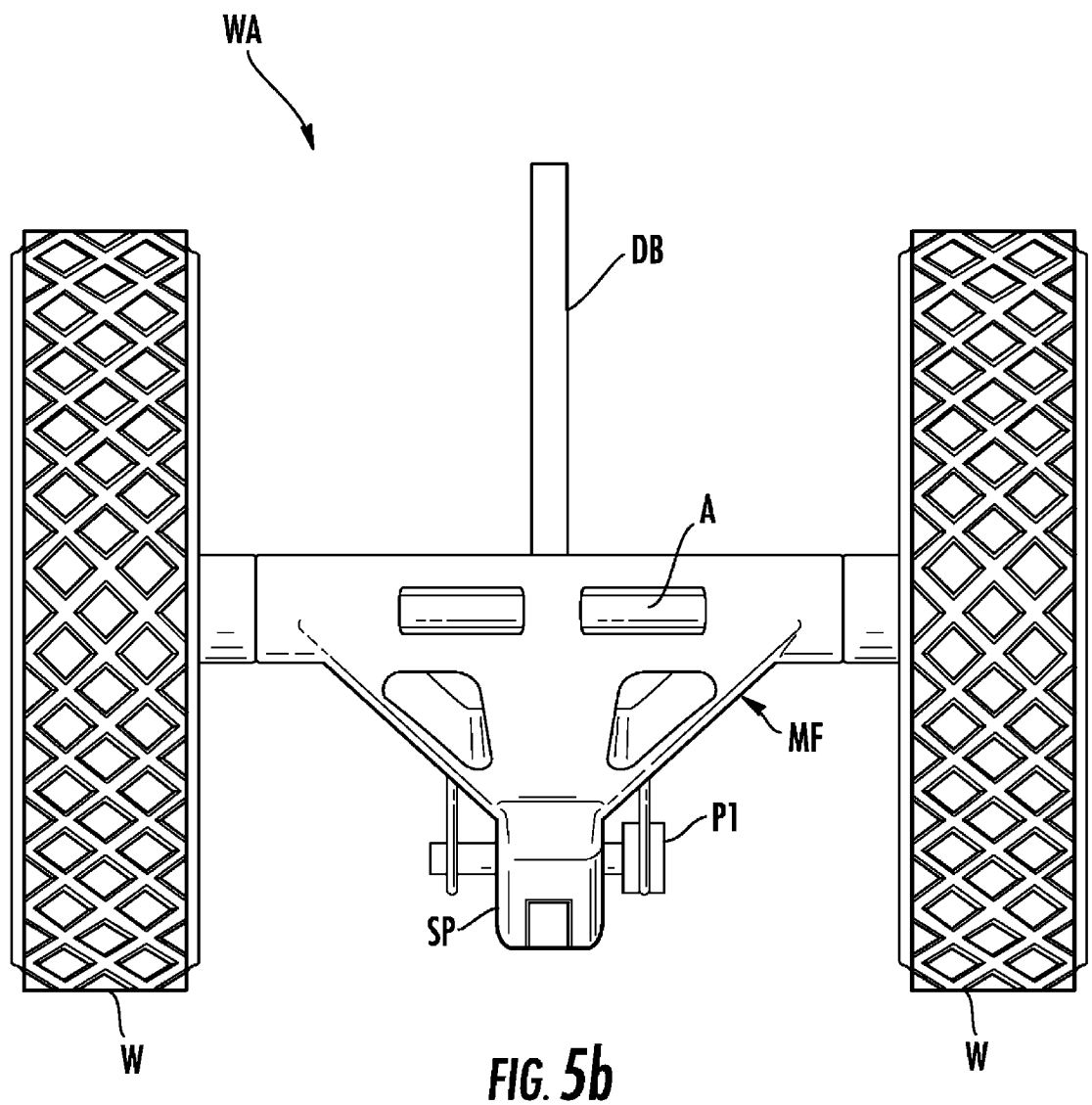
FIG. 5b is a rear view of an embodiment of a wheel apparatus for transporting and storing a tilling machine, shown attached to a drag bar in a storage position according to the subject matter disclosed herein.
Figure 6A:
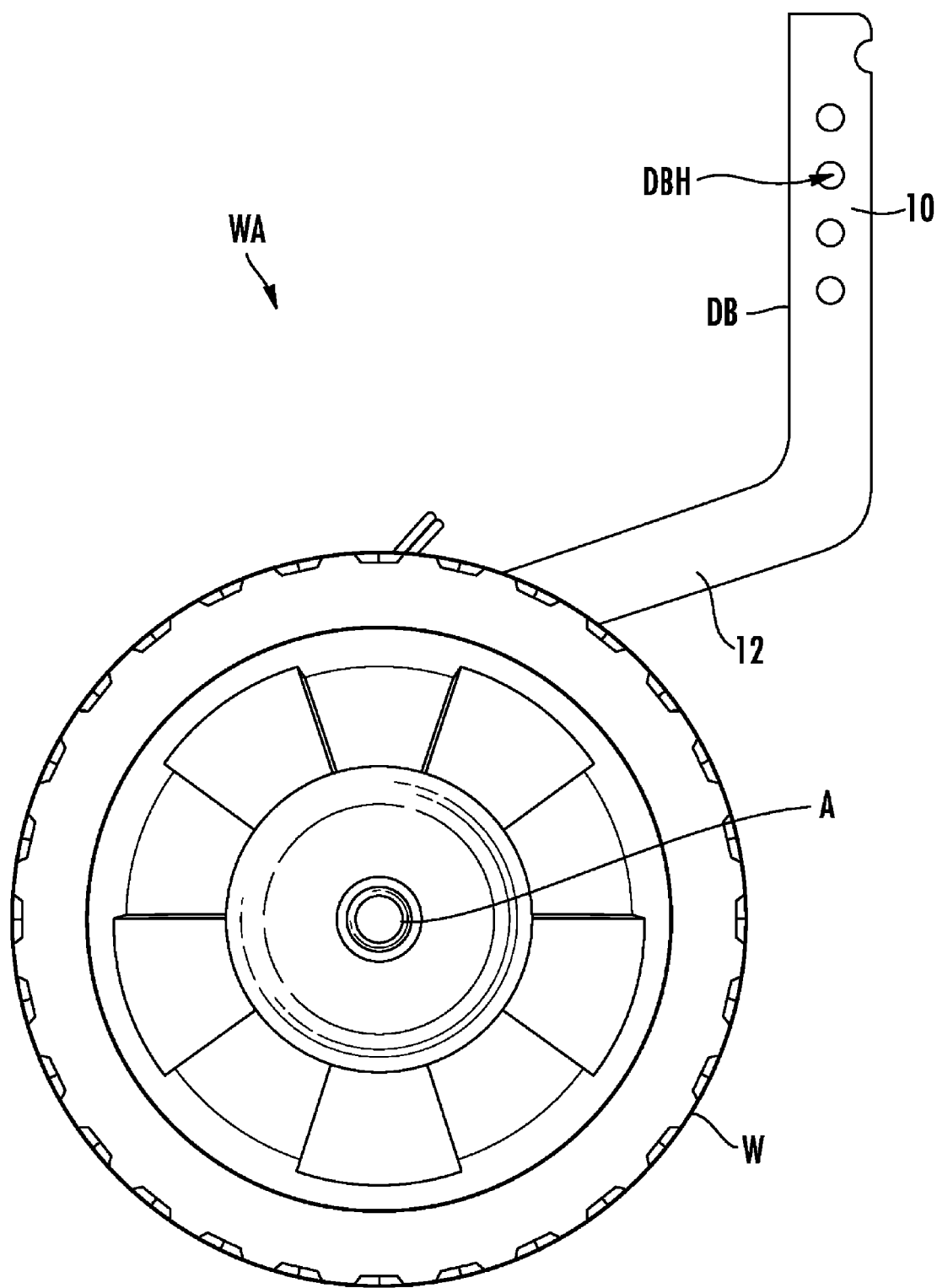
FIG. 6a is a side view of an embodiment of a wheel apparatus for transporting and storing a tilling machine, shown attached to a drag bar in a transport position according to the subject matter disclosed herein.
Figure 6B:
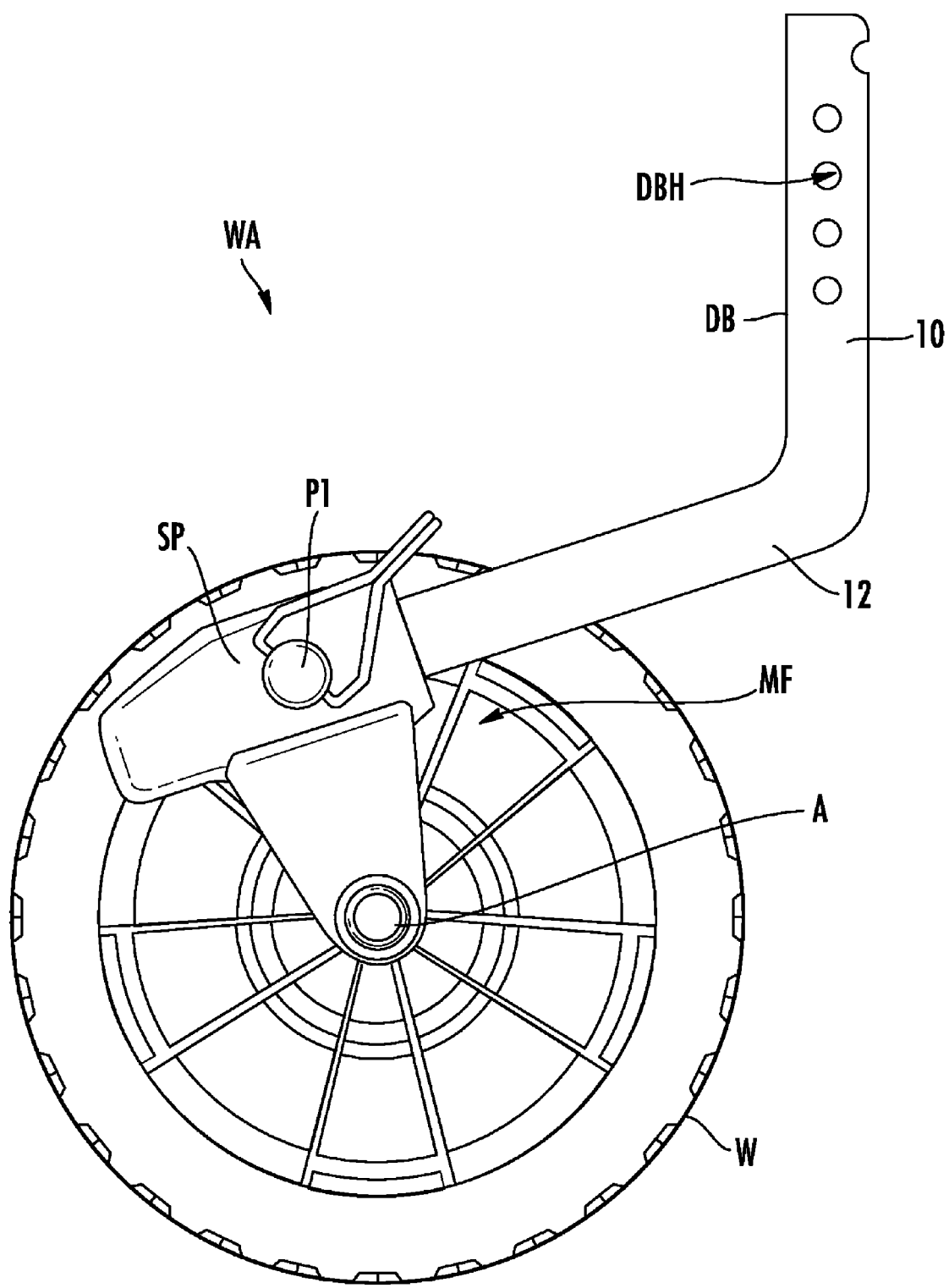
FIG. 6b is a cross-sectional view of FIG. 3a illustrating an embodiment of a wheel apparatus for transporting and storing a tilling machine, shown attached to a drag bar in a transport position according to the subject matter disclosed herein.
Figure 7A:
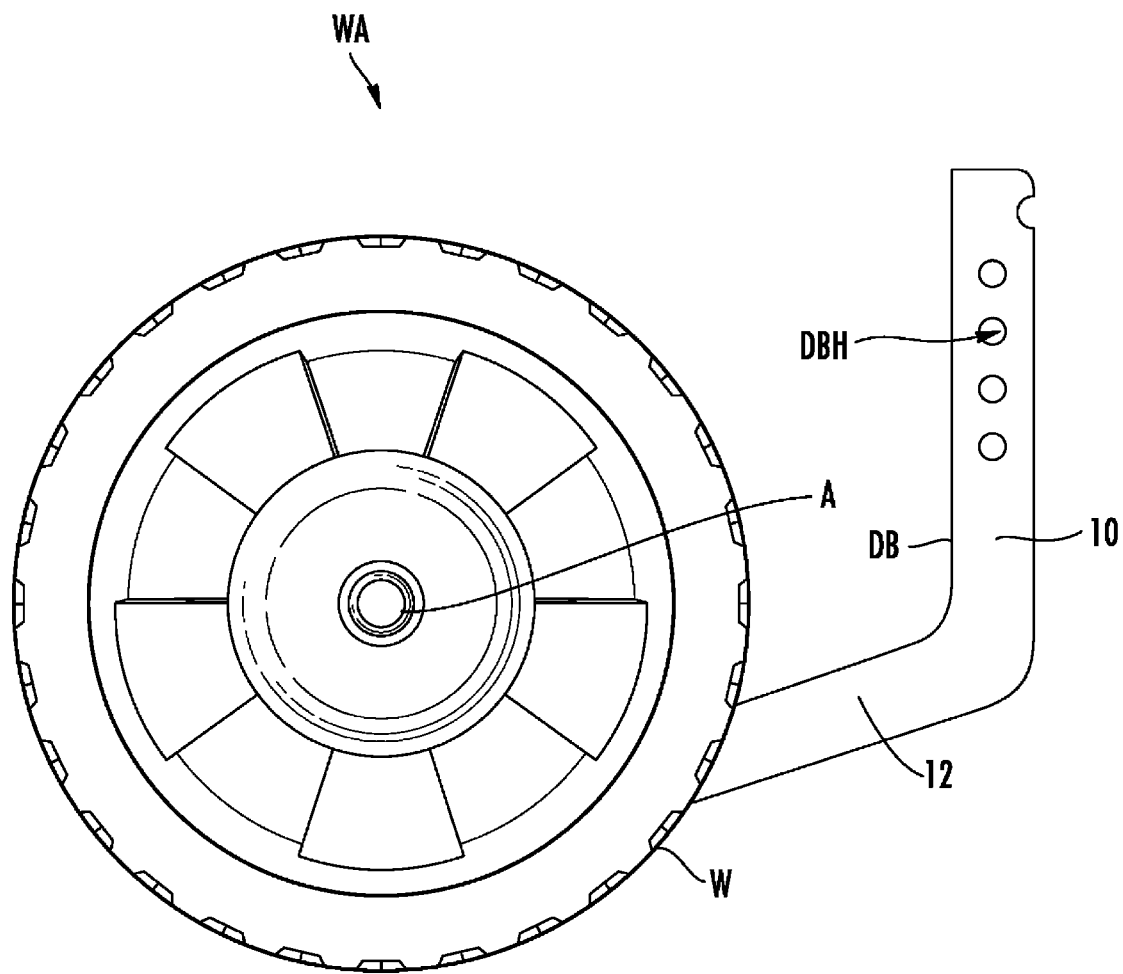
FIG. 7a is a side view of an embodiment of a wheel apparatus for transporting and storing a tilling machine, shown attached to a drag bar in a storage position according to the subject matter disclosed herein.
Figure 7B:
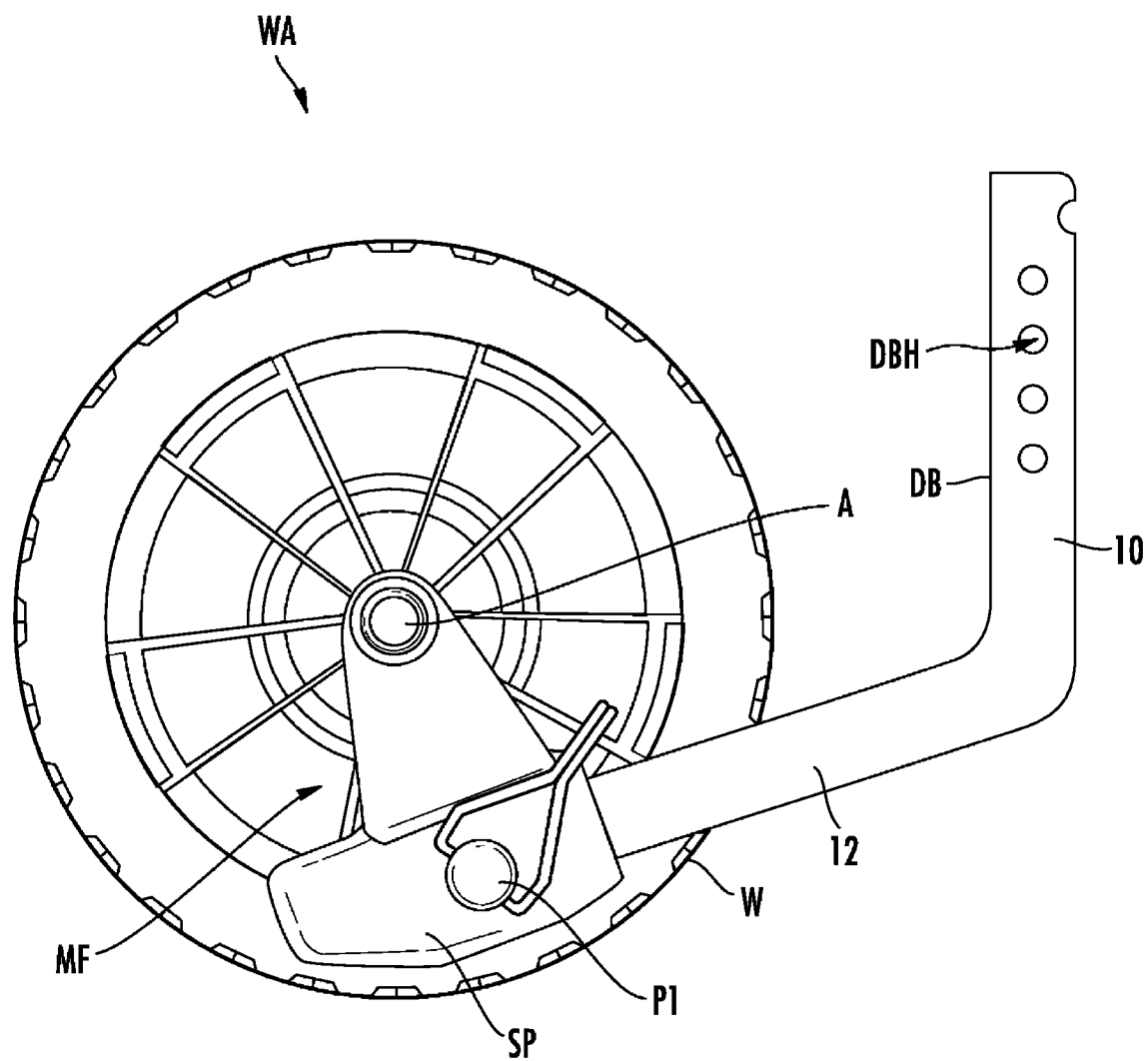
FIG. 7b is a cross-sectional view of FIG. 3b illustrating an embodiment of a wheel apparatus for transporting and storing a tilling machine shown attached to a drag bar in a storage position according to the subject matter disclosed herein.

Wheel apparatus WA can be fixedly attached to tiller T in any suitable manner as known to those of skill in the art. In one aspect of the present disclosure, as illustrated in FIG. 2, wheel apparatus WA can comprise a mounting frame generally designated MF that can be removably attached to drag bar DB. In other aspects, wheel apparatus WA can be linked or attached to tiller T with coupling methods known to those of skill in the art.

With continuing reference to FIG. 2, drag bar DB can be substantially L-shaped and can have a substantially vertical portion 10 and a substantially horizontal portion 12. Vertical portion 10 of drag bar DB can define a plurality of holes generally designated DBH for varying the attachment height of drag bar DB to the rear portion of tiller T for facilitating a transport position and a storage position, wherein horizontal portion 12 of drag bar DB can extend rearwardly therefrom. A drag bar pin DBP can be received within holes DBH for securing drag bar DB to tiller T. A key K can be attached to drag bar pin DBP to prevent removal of drag bar pin DBP when inserted into holes DBH. Horizontal portion 12 of drag bar DB can define an aperture generally designated 14 that can receive a locking pin P1 for lockably attaching drag bar DB to mounting frame MF.

With further reference to FIG. 2 mounting frame MF of wheel apparatus WA can have a sleeve portion SP that can define an interior space generally designated IS. Horizontal portion 12 of drag bar DB can be configured to be slidably received within interior space IS. Sleeve portion SP can define a hole generally designated H1 that can align with aperture 14 of drag bar DB. Locking pin P1 can be inserted into hole H1 of sleeve portion SP and can then be guided through aperture 14 of drag bar DB. Locking pin P1 can exit sleeve portion SP through a corresponding hole H1 on the side of sleeve portion SP opposite the insertion side.

Mounting frame MF can further include an axle housing AH. Axle housing AH can be substantially elongate and hollow for receiving an axle A. Axle A can be rotatably mounted within axle housing AH and can extend horizontally from both ends of axle housing AH to provide for the attachment of a plurality of wheels W to each end of axle A. Thus, axle A and wheels W can rotate freely. A plurality of endcaps 20 can be attached to wheels W to prevent axle A from extending beyond wheels W. In one aspect, wheel apparatus WA can comprise one wheel W that can be attached to mounting frame MF such that a user could transport tiller T by rolling tiller T on wheel W and the user can also stabilize tiller T in a storage position in a stabilizing manner similar to that of a tripod.

Figure 8A:
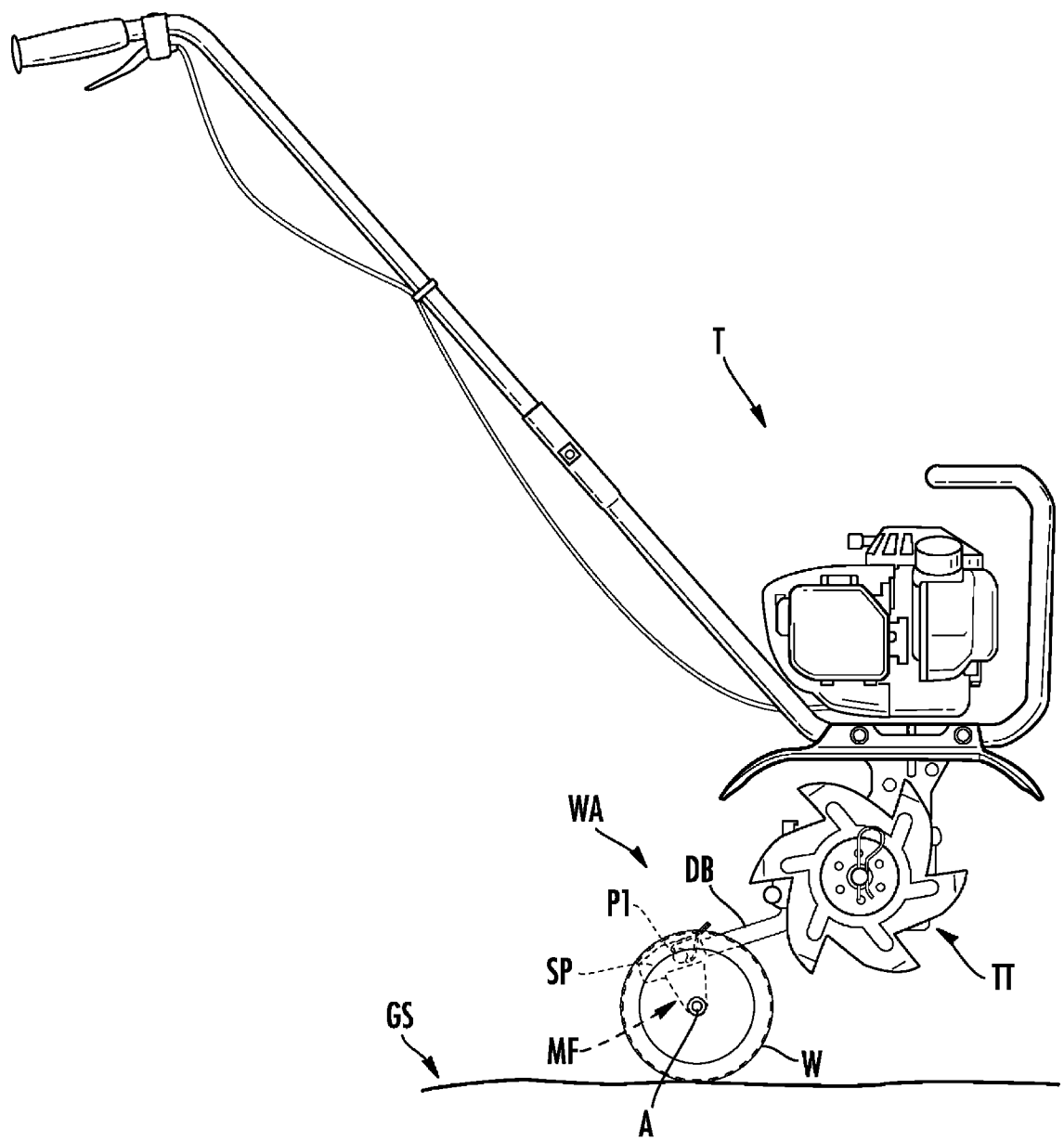
FIG. 8a is a side view of an embodiment of a wheel apparatus for transporting and storing a tilling machine shown attached to a mini-tiller in a transport position according to the subject matter disclosed herein.

In accordance with the present subject matter, wheel apparatus WA can be attached to drag bar DB in one or more positions for providing various functions. A transport position is illustrated in FIGS. 3a, 4a, 5a, 6a, 6b and 8a. The transport position can be used when the user is not operating tiller T in a tilling manner. When in the transport position, wheel apparatus WA can be used to lift and maintain tiller tines TT off the ground surface. Thus, the user can transport tiller T to a storage location or other area to be tilled without awkwardly attempting to carry tiller T or to roll tiller tines TT over a damaging surface. The user can attach wheel apparatus WA to tiller T by sliding drag bar DB within sleeve portion SP and coupling thereto with locking pin P1. In the transport position, sleeve portion SP of mounting frame MF and horizontal portion 12 (FIGS. 5a, 6a, 6b and 8a) of drag bar DB can be fixedly oriented substantially above axle A. By attaching wheel apparatus WA to drag bar DB in the transport position, tiller T and tiller tines TT can be maintained in a spaced-apart manner above a ground surface generally designated GS, as illustrated in FIG. 8a. With wheel apparatus WA attached to tiller T in the transport position, the weight of the tiller T can be supported by wheels W of wheel apparatus WA, wherein tiller T can be rolled during transport.

Figure 8B:
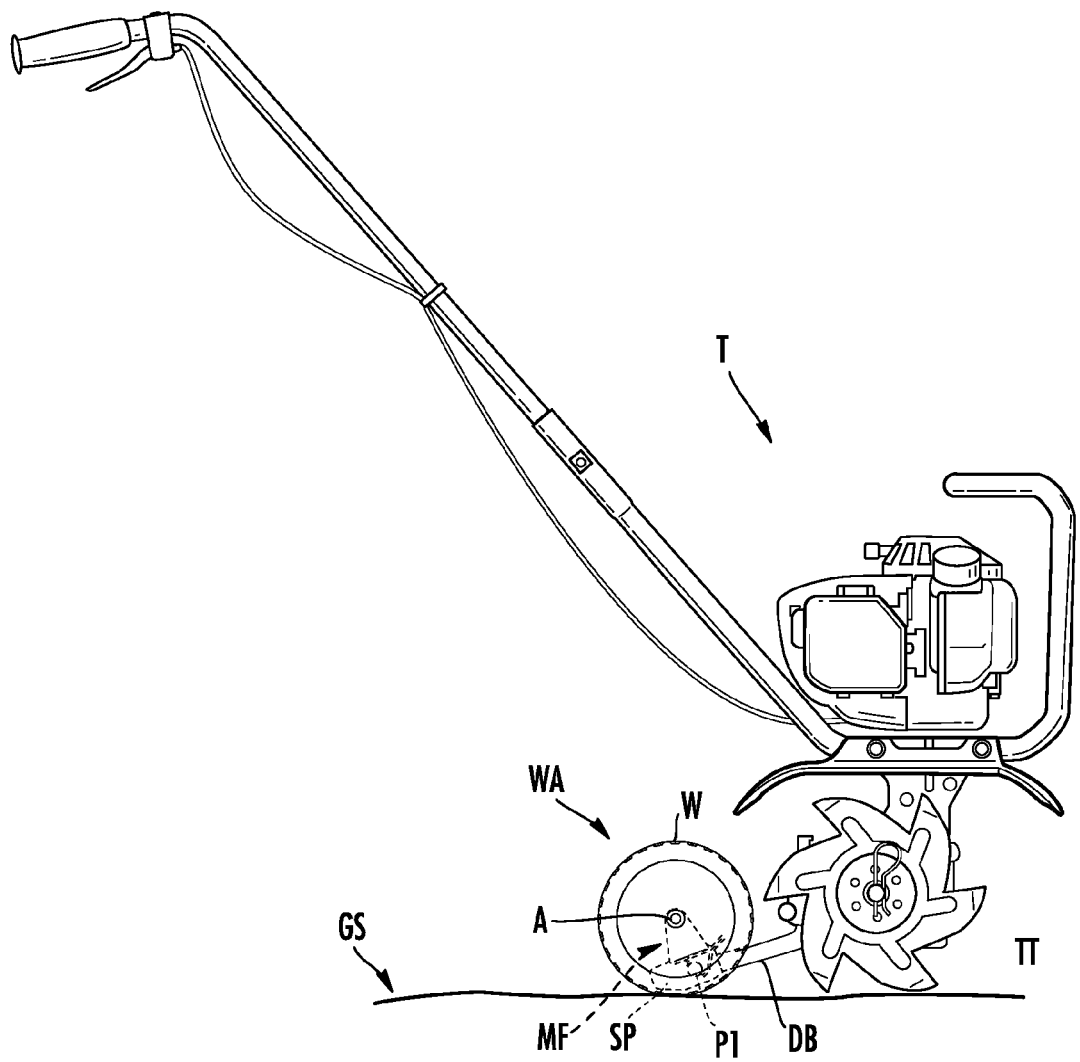
FIG. 8b is a side view of an embodiment of a wheel apparatus for transporting and storing a tilling machine, shown attached to a mini-tiller in a storage position according to the subject matter disclosed herein.

As illustrated in FIGS. 3b, 4b, 5b, 7a, 7b and 8b, wheel apparatus WA can be attached to drag bar DB of tiller T in a storage position. The storage position can be used when tiller T is stored in a standing position. When in the storage position, wheel apparatus WA can be used to provide additional stability to tiller T, thereby aiding in preventing tiller T from easily being tipped over due to the irregular shape of tiller tines TT. In the storage position, wheel apparatus WA is configured to permit tiller tines TT to rest on the ground surface. Thus, wheels W and tiller tines TT can more evenly distribute the weight of tiller T to provide a more stable storage position. The user can attach wheel apparatus WA to tiller T by sliding drag bar DB within sleeve portion SP and coupling thereto with locking pin P1. In the storage position, sleeve portion SP of mounting frame MF and horizontal portion 12 (FIGS. 7a, 7b and 8b) of drag bar DB can be fixedly oriented substantially below axle A. By attaching wheel apparatus WA to drag bar DB in the storage position, the tines TT of tiller T and wheels W of the wheel apparatus WA can be simultaneously in contact with ground surface GS, as shown in FIG. 8b, to stabilize tiller T, which is particularly useful for storage of tiller T.

In another aspect, the user can easily switch wheel apparatus WA from a transport position to a storage position by removing locking pin P1 and switching the position of wheels W. Wheel apparatus WA can be easily changed between the transport and storage positions, and visa-versa, by removing locking pin P1, sliding wheel apparatus WA off of drag bar DB, flipping the wheel apparatus WA over, and re-attaching wheel apparatus WA to drag bar DB. Wheel apparatus WA can be configured such that no vertical adjustment of vertical portion 10 of drag bar DB is necessary when switching from storage position to transport position or vice-versa. In such a configuration, drag bar pin DBP can remain in the same hole DBH in both positions. Vertical portion 10 of drag bar DB can be adjusted vertically using various holes DBH and drag bar pin DBP to adjust wheel apparatus WA to accommodate various sized tillers T. Additionally, wheel apparatus WA can be an auxiliary device that can be completely removed and remain unattached when desired such as, for example, when tiller T is in operation.

It can therefore be seen from the foregoing that the embodiments disclosed herein provide apparatuses and methods to transport and store a mini-tiller or other suitable tilling machines by attaching, in a transport or storage position, an auxiliary wheel kit apparatus to the drag bar of the mini-tiller.

It will be understood that various details of the disclosed subject matter may be changed without departing from the scope of the disclosed subject matter. Furthermore, the foregoing description is for the purpose of illustration only, and not for the purpose of limitation.

What is claimed is:

1. A wheel apparatus in combination with a drag bar attached to a tilling machine and contactable with soil during a tilling operation, the wheel apparatus comprising:
   a mounting frame comprising a sleeve portion, the sleeve portion configured to receive the drag bar therein, such that when the drag bar is received in the sleeve portion and the drag bar is attached to the tilling machine, the mounting frame is also attached to the tilling machine;
   at least one wheel rotatably attached to the mounting frame; and
   the mounting frame being attachable to the drag bar in a transport position to facilitate transport of the tilling machine with the sleeve portion of the mounting frame on the drag bar and at least a portion of the at least one wheel extending below the drag bar and in a storage position to stabilize the tilling machine for storage with the sleeve portion of the mounting frame on the drag bar and at least a portion of the at least one wheel extending below the drag bar such that the at least one wheel is closer to the tilling machine in the storage position than in the transport position, and the mounting frame being detachable from the drag bar in a tilling mode to permit the drag bar to be contactable with the soil.

2. The wheel apparatus of claim 1, wherein the mounting frame and the drag bar are coupled by sliding the sleeve portion of the mounting frame over an end of the drag bar.

3. The wheel apparatus of claim 1 wherein the drag bar has a plurality of holes for moving the drag bar in a vertical position to position the drag bar in one of the transport position and storage position.

4. The wheel apparatus of claim 1, further comprising a locking pin for attaching the mounting frame to the drag bar.

5. The wheel apparatus of claim 4, wherein the sleeve portion of the mounting frame defines a hole for receiving the locking pin.

6. The wheel apparatus of claim 1, wherein the tiller tines of the tilling machine are maintained in a spaced-apart manner from the ground surface when in the transport position, thereby enabling transport of the tilling machine by rolling the tilling machine on the at least one wheel.

7. The wheel apparatus of claim 1, wherein the tiller tines of the tilling machine contact the ground surface when in the storage position to stabilize the tilling machine for storage.

8. The wheel apparatus of claim 1, further comprising an axle for rotatably attaching the at least one wheel to the mounting frame.

9. The wheel apparatus of claim 8, wherein the sleeve portion of the mounting frame is oriented substantially above the axle when in the transport position.

10. A wheel apparatus in combination with a drag bar attached to a tilling machine and contactable with soil during a tilling operation, the wheel apparatus comprising:
    a mounting frame comprising an axle housing and a sleeve portion, the sleeve portion configured to receive the drag bar therein, such that when the drag bar is received in the sleeve portion and the drag bar is attached to the tilling machine, the mounting frame is also attached to the tilling machine;
    an axle disposed within the axle housing of the mounting frame;
    at least one wheel rotatably attached to the axle within the axle housing of the mounting frame;
    the mounting frame being attachable to the drag bar in a transport position to facilitate transport of the tilling machine and in a storage position to stabilize the tilling machine for storage, and the mounting frame being detachable from the drag bar in a tilling mode to permit the drag bar to be contactable with the soil; and
    wherein the sleeve portion of the mounting frame is oriented substantially below the axle when in the storage position.

11. A tilling machine apparatus comprising:
    a motor for propelling the tilling machine;
    a housing configured for holding the motor;
    a handle attached to the housing;
    a plurality of tiller tines operatively connected to the motor;
    a drag bar attached to the housing; and
    a wheel apparatus for attachment to the drag bar of the tilling machine, comprising:
       a mounting frame comprising a sleeve portion for fixedly receiving the drag bar;
       at least one wheel rotatably attached to the mounting frame; and,
       the mounting frame being attachable to the drag bar of the tilling machine in a transport position to facilitate transport of the tilling machine with the sleeve portion of the mounting frame on the drag bar and at least a portion of the at least one wheel extending below the drag bar and in a storage position to stabilize the tilling machine for storage with the sleeve portion of the mounting frame on the drag bar and at least a portion of the at least one wheel extending below the drag bar such that the at least one wheel is closer to the motor of the tilling machine in the storage position than in the transport position, and the mounting frame being detachable from the drag bar in a tilling mode to permit the drag bar to be contactable with the soil.

12. The wheel apparatus of claim 11, wherein attaching the wheel apparatus to the drag bar of the tilling machine comprises coupling the mounting frame and drag bar by sliding the sleeve portion of the mounting frame over an end of the drag bar.

13. The wheel apparatus of claim 11, wherein the tiller tines of the tilling machine are maintained in a spaced-apart manner from the ground surface when in the transport position, thereby enabling transport of the tilling machine by rolling the tilling machine on the at least one wheel.

14. The wheel apparatus of claim 11, wherein the tiller tines of the tilling machine contact the ground surface when in the storage position to stabilize the tilling machine for storage.

15. The wheel apparatus of claim 11, wherein the drag bar has a plurality of holes for moving the drag bar in a vertical position to position the drag bar in one of the transport position and storage position.

16. The wheel apparatus of claim 11, further comprising a locking pin for attaching the mounting frame to the drag bar.

17. The wheel apparatus of claim 16, wherein the sleeve portion of the mounting frame defines a hole for receiving the locking pin.

18. The wheel apparatus of claim 11, further comprising an axle for rotatably attaching the at least one wheel to the mounting frame.

19. The wheel apparatus of claim 18, wherein the sleeve portion of the mounting frame is oriented substantially above the axle when in the transport position.

20. A tilling machine apparatus comprising:
a motor for propelling the tilling machine;
a housing configured for holding the motor;
a handle attached to the housing;
a plurality of tiller tines operatively connected to the motor;
a drag bar attached to the housing; and
a wheel apparatus for attachment to the drag bar of the tilling machine, comprising:
   a mounting frame comprising an axle housing and a sleeve portion for fixedly receiving the drag bar;
   an axle disposed within the axle housing of the mounting frame;
   at least one wheel rotatably attached to the axle within the axle housing of the mounting frame; and,
   the mounting frame being attachable to the drag bar of the tilling machine in a transport position to facilitate transport of the tilling machine and in a storage position to stabilize the tilling machine for storage, and the mounting frame being detachable from the drag bar in a tilling mode to permit the drag bar to be contactable with the soil; and
wherein the sleeve portion of the mounting frame is oriented substantially below the axle when in the storage position.

21. A method of transporting a tilling machine comprising:
attaching a drag bar to a tilling machine, the drag bar configured to be contactable with soil during a tilling operation;
attaching a wheel apparatus to the drag bar, the wheel apparatus comprising:
   a mounting frame comprising a sleeve portion, the sleeve portion configured to receive the drag bar therein, such that when the drag bar is received in the sleeve portion and the drag bar is attached to the tilling machine, the mounting frame is also attached to the tilling machine;
   at least one wheel rotatably attached to the mounting frame; and
   the mounting frame being attachable to the drag bar in a transport position to facilitate transport of the tilling machine with the sleeve portion of the mounting frame on the drag bar and at least a portion of the at least one wheel extending below the drag bar and in a storage position to stabilize the tilling machine for storage with the sleeve portion of the mounting frame on the drag bar and at least a portion of the at least one wheel extending below the drag bar such that the at least one wheel is closer to the tilling machine in the storage position than in the transport position, and the mounting frame being detachable from the drag bar in a tilling mode to permit the drag bar to be contactable with the soil; and
securing the wheel apparatus to the drag bar by locking the mounting frame of the wheel apparatus to the drag bar, whereby the wheel apparatus can support the tilling machine on the at least one wheel of the wheel apparatus to facilitate the tilling machine to be rolled for transport.

22. A method of storing a tilling machine comprising:
attaching a drag bar to a tilling machine, the drag bar configured to be contactable with soil during a tilling operation;
attaching a wheel apparatus to the drag bar, the wheel apparatus comprising:
   a mounting frame comprising a sleeve portion, the sleeve portion configured to receive the drag bar therein, such that when the drag bar is received in the sleeve portion and the drag bar is attached to the tilling machine, the mounting frame is also attached to the tilling machine;
   at least one wheel rotatably attached to the mounting frame; and
   the mounting frame being attachable to the drag bar in a transport position to facilitate transport of the tilling machine with the sleeve portion of the mounting frame on the drag bar and at least a portion of the at least one wheel extending below the drag bar and in a storage position to stabilize the tilling machine for storage with the sleeve portion of the mounting frame on the drag bar and at least a portion of the at least one wheel extending below the drag bar such that the at least one wheel is closer to the tilling machine in the storage position than in the transport position and the mounting frame being detachable from the drag bar in a tilling mode to permit the drag bar to be contactable with the soil; and
securing the wheel apparatus to the drag bar by locking the mounting frame of the wheel apparatus to the drag bar, whereby the at least one wheel of the wheel apparatus is in contact with a ground surface to provide stability to the tilling machine while in the storage position.

* * * * *